United States Patent
Preiss et al.

(10) Patent No.: US 11,678,150 B2
(45) Date of Patent: Jun. 13, 2023

(54) EVENT-BASED DYNAMIC PREDICTION IN LOCATION SHARING ON MOBILE DEVICES

(71) Applicant: International Business Machines Corporation, Armonk, NY (US)

(72) Inventors: Tanner Mark Preiss, Schnecksville, PA (US); Christian Compton, Austin, TX (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 17/449,820

(22) Filed: Oct. 4, 2021

(65) Prior Publication Data
US 2023/0106994 A1 Apr. 6, 2023

(51) Int. Cl.
H04W 24/00 (2009.01)
G06Q 10/00 (2023.01)
G06F 7/00 (2006.01)
*H04W 4/21* (2018.01)
*H04W 4/70* (2018.01)
*H04W 4/029* (2018.01)

(52) U.S. Cl.
CPC ............. *H04W 4/21* (2018.02); *H04W 4/029* (2018.02); *H04W 4/70* (2018.02)

(58) Field of Classification Search
CPC .......... H04W 4/21; H04W 4/70; H04W 4/029
USPC ...................................................... 455/456.1
See application file for complete search history.

(56) References Cited

U.S. PATENT DOCUMENTS 7,848,765 B2 12/2010 Phillips
9,769,610 B1 9/2017 Gordon
(Continued)

FOREIGN PATENT DOCUMENTS

CA 2698927 A 10/2010

OTHER PUBLICATIONS

Anonymous, "Method and System for Sharing Location Information of a User with Different User Groups at Different Levels of Precision," IP.com No. IPCOM000203584D, IP.com Publication Date: Jan. 28, 2011.
(Continued)

*Primary Examiner* — Mark G. Pannell
(74) *Attorney, Agent, or Firm* — Edward P. Li (57) ABSTRACT

A computer-implemented method, a computer program product, and a computer system for event-based dynamic prediction in location sharing on mobile devices. The computer system captures biometric data of a user, in response to starting location sharing requested by the user. The computer system collects action-based context of behavior of the user during the location sharing, determines activities of the user and one or more sharing users during the location sharing, determines context of the location sharing, tracks activities of the user and the one or more sharing users after the location sharing is ended, and tracks social network relationships between the user and the one or more sharing users. The computer system creates a knowledge corpus for training a machine learning model for prediction in a future location sharing event, using obtained information.

20 Claims, 5 Drawing Sheets

(56) References Cited

U.S. PATENT DOCUMENTS

| | | | |
|---|---|---|---|
| 2012/0166267 A1* | 6/2012 | Beatty | G06Q 30/0219 |
| | | | 705/14.46 |
| 2013/0253980 A1* | 9/2013 | Blom | G06Q 30/0251 |
| | | | 705/7.29 |
| 2014/0122473 A1* | 5/2014 | Fletcher | G06Q 50/01 |
| | | | 707/732 |
| 2014/0256350 A1 | 9/2014 | Booking | |
| 2015/0172393 A1 | 6/2015 | Oplinger | |
| 2015/0248739 A1* | 9/2015 | Schulman | G09B 7/02 |
| | | | 705/327 |
| 2015/0312764 A1* | 10/2015 | Tuukkanen | G08B 29/188 |
| | | | 455/411 |
| 2016/0308798 A1 | 10/2016 | Magistrado | |
| 2017/0093882 A1 | 3/2017 | Khuu | |
| 2019/0149955 A1 | 5/2019 | Rusu | |
| 2019/0182626 A1 | 6/2019 | Miller | |
| 2020/0213812 A1 | 7/2020 | Miller | |

OTHER PUBLICATIONS

Mell et al., "The NIST Definition of Cloud Computing", NIST, National Institute of Standards and Technology, Special Publication 800-145, Sep. 2011, 7 pages.

\* cited by examiner

EVENT-BASED DYNAMIC PREDICTION IN LOCATION SHARING ON MOBILE DEVICES

BACKGROUND

The present invention relates generally to location sharing on mobile devices, and more particularly to event-based dynamic prediction using a machine learning model in location sharing on mobile devices.

Currently, mobile devices are used to share live locations on a dynamic real-time basis for a defined time range to specified users. In this case, location sharing can be live location sharing or static location sharing to a receiving party. Needs of location sharing vary across time and context based on events. It is common that a user may forget to enable location sharing in situations where they are needed. At the same time, one or more recipients or sharing users of location sharing are also different across context and various times.

SUMMARY

In one aspect, a computer-implemented method for event-based dynamic prediction in location sharing on mobile devices is provided. The computer-implemented method includes, in response to starting location sharing requested by a user, capturing biometric data of the user. The computer-implemented method further includes collecting action-based context of behavior of the user during the location sharing. The computer-implemented method further includes determining activities of the user and one or more sharing users during the location sharing. The computer-implemented method further includes determining context of the location sharing. The computer-implemented method further includes tracking activities of the user and the one or more sharing users after the location sharing is ended. The computer-implemented method further includes tracking social network relationships between the user and the one or more sharing users. The computer-implemented method further includes creating a knowledge corpus for training a machine learning model for prediction in a future location sharing event, using obtained information related to the location sharing and related to the user and the one or more sharing users.

In another aspect, a computer program product for event-based dynamic prediction in location sharing on mobile devices is provided. The computer program product comprises a computer readable storage medium having program instructions embodied therewith, and the program instructions are executable by one or more processors. The program instructions are executable to, in response to starting location sharing requested by a user, capture biometric data of the user; collect action-based context of behavior of the user during the location sharing; determine activities of the user and one or more sharing users during the location sharing; determine context of the location sharing; track activities of the user and the one or more sharing users after the location sharing is ended; track social network relationships between the user and the one or more sharing users; and create a knowledge corpus for training a machine learning model for prediction in a future location sharing event, using obtained information related to the location sharing and related to the user and the one or more sharing users.

In yet another aspect, a computer system for event-based dynamic prediction in location sharing on mobile devices is provided. The computer system comprises one or more processors, one or more computer readable tangible storage devices, and program instructions stored on at least one of the one or more computer readable tangible storage devices for execution by at least one of the one or more processors. The program instructions are executable to, in response to starting location sharing requested by a user, capture biometric data of the user. The program instructions are further executable to collect action-based context of behavior of the user during the location sharing. The program instructions are further executable to determine activities of the user and one or more sharing users during the location sharing. The program instructions are further executable to determine context of the location sharing. The program instructions are further executable to track activities of the user and the one or more sharing users after the location sharing is ended. The program instructions are further executable to track social network relationships between the user and the one or more sharing users. The program instructions are further executable to create a knowledge corpus for training a machine learning model for prediction in a future location sharing event, using obtained information related to the location sharing and related to the user and the one or more sharing users.

DETAILED DESCRIPTION

Embodiments of the present invention disclose a method and system by which various sources of information (e.g., Internet of Things (IoT) enabled feeds, augmented reality (AR) based image analysis, textual communications, and biometric information of a user who requests location sharing) are analyzed to predict the needs, types (live or static), and duration of location sharing to identified targets or sharing users.

In embodiments of the present invention, by analyzing various source of information on real-time basis, the proposed system predicts the appropriate mode (live or static) and duration of location sharing to target recipients or sharing users. By considering historical location sharing patterns, duration of location sharing, relationship strength in a social network between the user who requests location sharing and the one or more target recipients (or sharing users), the proposed system predicts the one or more target recipients of location sharing. Using historical learning, the proposed system predicts a contextual situation related to the user's surrounding when the user may want to share a location to the one or more target recipients, and accordingly the proposed system predicts a potential reason of location sharing. The proposed system predicts an appropriate event (e.g., the user is excited about 50% discount in a shopping complex on their way, or an excited new brand vehicle on the road) and a contextual situation of location sharing, and accordingly on the mobile device of the user the system automatically initiates location sharing with the one or more target recipients. In embodiments of the present invention, based on the bond strength of the social network relationship the user who requests location sharing and the one or more target recipients, the contextual need of location sharing and importance to the sending or receiving party to share the location, the proposed system determines the different duration of location sharing for different recipients.

Figure 1:
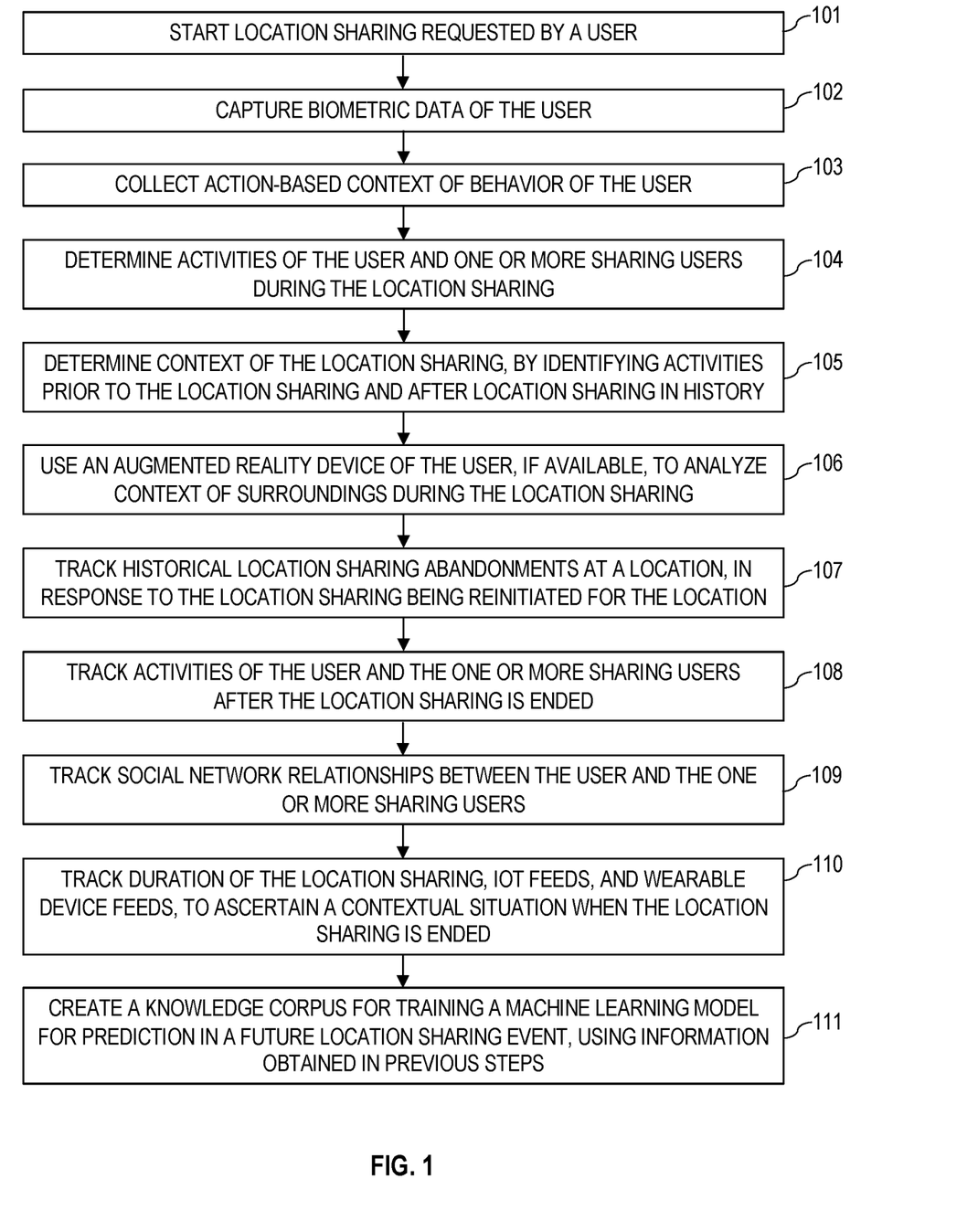
FIG. 1 is a flowchart showing operational steps of a learning process for event-based dynamic prediction in location sharing on mobile devices, in accordance with one embodiment of the present invention.

FIG. 1 is a flowchart showing operational steps of a learning process for event-based dynamic prediction in location sharing on mobile devices, in accordance with one embodiment of the present invention. The operational steps are implemented by the proposed system which is hosted on one or more computing devices or servers. A computing device or server is described in more detail in later paragraphs with reference to FIG. 3. The operational steps may be implemented by the proposed system which is in a cloud computing environment. The cloud computing environment is described in more detail in later paragraphs with reference to FIG. 4 and FIG. 5.

At step 101, the proposed system starts location sharing requested by a user. The location sharing is between the user with one or more sharing users. The user and the one or more sharing users register and opt in the location sharing service. With the proposed system, the user can select any sharing user (or recipient) and share a location with sharing user (or recipient). The mobile device of the user tracks the different location sharing behaviors over time, capturing information from the user about a reason of location sharing. The user may provide voice or textual detail about the reason of location sharing. Consents of the user and the one or more sharing users are required in using the proposed system for location sharing on mobile devices. In acquiring, processing, storing, transferring, and using the data by the proposed system during the location sharing on mobile devices, laws are observed, and privacy of the user and the one or more sharing users is protected.

At step 102, the proposed system captures biometric data of the user. When the location sharing is triggered by the user, the mobile device of the user gathers biometric information from the user. For example, the biometric information may include heartbeats or blood pressures during the location sharing; from the biometric information, the proposed system can determine whether the user is excited.

At step 103, the proposed system collects action-based context of behavior of the user during the location sharing. At step 104, the proposed system determines activities of the user and the one or more sharing users during the location sharing. The proposed system captures recipient-specific information; for example, the proposed system determines what the one or more sharing users (or recipients) are doing during the location sharing. For example, these steps may be done by tracking IoT feeds and wearable device feeds. For example, at these steps, the proposed system may use calendars of the user and the one or more sharing users to determine the activities of the user and the one or more sharing users.

At step 105, the proposed system determines context of the location sharing, by identifying activities prior to the location sharing and activities after location sharing in history. The proposed system tracks how participating parties (including the user and the one or more sharing users) perform various activities related to the location sharing. Determining the context of the location sharing is by identifying the activities before the location sharing is triggered. Information about the activities before the location sharing can be identified form user's biometric parameters, feeds of surrounding IoT devices, or user's voice command related to the location sharing. Determining the context of the location sharing is by identifying the activities after location sharing in history. The activities after location sharing in history can be what the user is doing after the location sharing; for example, user's following up with the one or more sharing users. The information about the activities after location sharing in history can be obtained form historical data stored in a database.

At step 106, the proposed system uses an augmented reality (AR) device of the user, if available, to analyze context of surroundings during the location sharing. The AR device, for example, may be AR glasses. At step 107, the proposed system tracks historical location sharing abandonment at a location, in response to the location sharing being reinitiated for the location. For the location, the user may have stopped previous location sharing and the user reinitiates the current location sharing.

At step 108, the proposed system tracks activities of the user and the one or more sharing users after the location sharing is ended. After stopping of the location sharing, the proposed system tracks what activities the participating users (including the user and the one or more sharing users) are doing. For example, the stopping of the location sharing is marked by events including but not limited to: the user reaches at a destination, the location sharing is stopped, and the one or more sharing users (or recipients) arrive at user's location.

At step 109, the proposed system tracks social network relationships between the user and the one or more sharing users. For example, the proposed system tracks bond strength of the social network relationship, based on how frequently the participating parties talk, meet, or share locations etc. At step 110, the proposed system tracks duration of the location sharing, IoT feeds, and wearable device feeds, to ascertain a contextual situation when the location sharing is ended.

At step 111, the proposed system creates a knowledge corpus for training a machine learning model for prediction in a future location sharing event, using information obtained in previous steps. The obtained information is related to the location sharing and related to the user and the one or more sharing users. The knowledge corpus is stored in a database. The machine learning model will be used to predict a reason for sharing the location and predict the one or more sharing users in a future location sharing event, which will be discussed in detail in later paragraphs with reference to FIG. 2.

Figure 2:
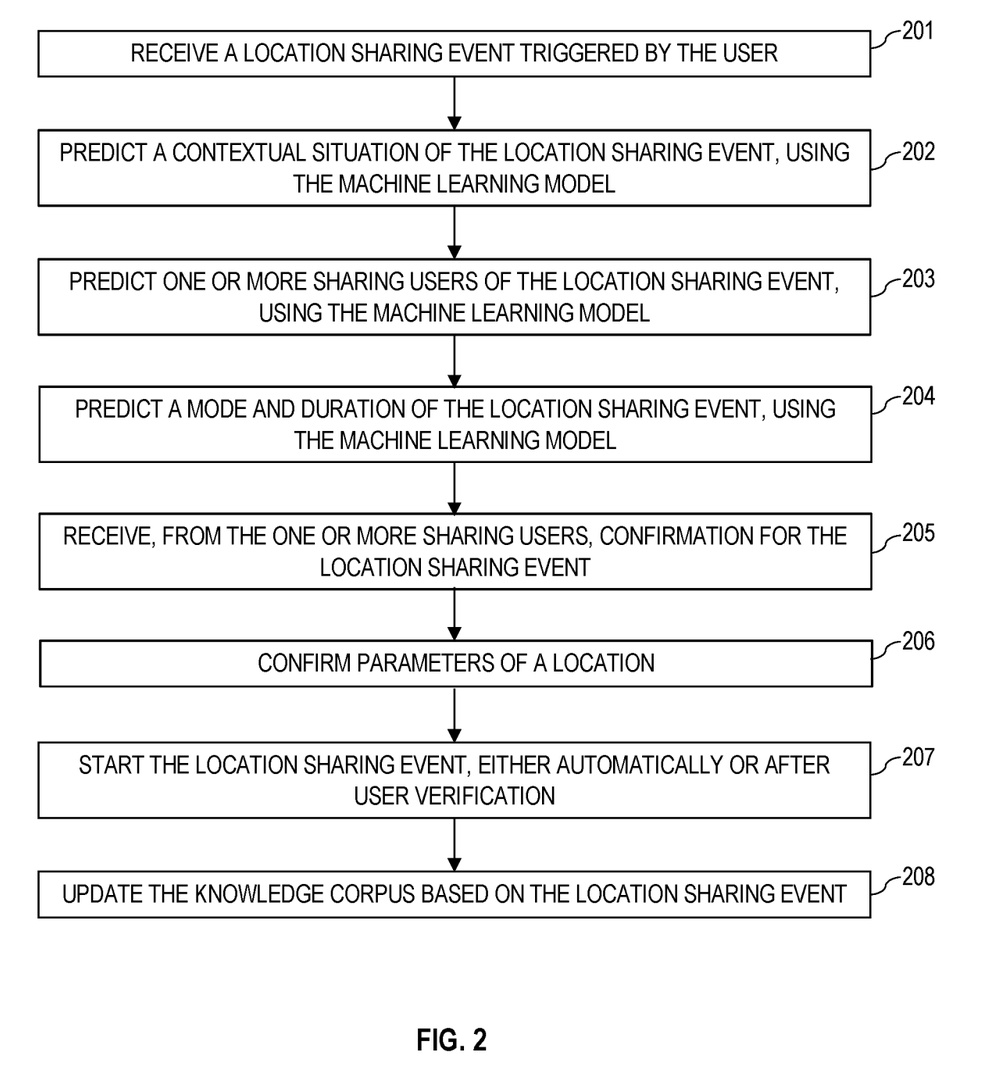
FIG. 2 is a flowchart showing operational steps of using a machine learning model for event-based dynamic prediction in location sharing on mobile devices, in accordance with one embodiment of the present invention.

FIG. 2 is a flowchart showing operational steps of using a machine learning model for event-based dynamic prediction in location sharing on mobile devices, in accordance with one embodiment of the present invention. The operational steps are implemented by the proposed system which is hosted on one or more computing devices or servers. A computing device or server is described in more detail in later paragraphs with reference to FIG. 3. The operational steps may be implemented by the proposed system which is in a cloud computing environment. The cloud computing environment is described in more detail in later paragraphs with reference to FIG. 4 and FIG. 5.

At step 201, the proposed system receives a location sharing event triggered by the user. The user starts the location sharing event and will share a location with one or more sharing users of the current location sharing event. The user and the one or more sharing users of the current location sharing event have registered and opted in the location sharing service provided by the proposed system. In using the proposed system for location sharing on mobile devices, consents of the user and the one or more sharing users are required. In acquiring, processing, storing, transferring, and using the data by the proposed system, laws are observed, and privacy of the user and the one or more sharing users is protected.

At step 202, the proposed system predicts a contextual situation of the location sharing event, using the machine learning model. The machine learning model has been established through machine learning steps described in previous paragraphs with reference to FIG. 1.

At step 203, the proposed system predicts one or more sharing users of the location sharing event, using the machine learning model. In predicting the one or more sharing users of the location sharing event, the proposed system considers historical location sharing patterns, duration of location sharing, the relationship strength between the user and the one or more sharing users of the current location sharing event.

At step 204, the proposed system predicts a mode and duration of the location sharing event, using the machine learning model. For example, by inputting received wearable device feed, IoT feed, surrounding context, etc. into the machine learning model, the proposed system will predict one or more reasons of the location sharing event. For example, the mode of the location sharing may be live or static location sharing.

At step 205, the proposed system receives, from the one or more sharing users, confirmation for the location sharing event. At this step, the proposed system determines duration of the location sharing for each of the one or more sharing users. At step 206, the proposed system confirms parameters of the location, such as the coordinate of the location.

At step 207, the proposed system starts the location sharing event, either automatically or after user verification. In one embodiment, the proposed system will automatically start the location sharing event after processing steps 201-206. In another embodiment, the proposed system will request the user to verify the one or more sharing users of the current location sharing event and the one or more reasons of the current location sharing event; once the user verification is completed, the proposed system will start the location sharing event. At step 208, the proposed system updates the knowledge corpus based on the current location sharing event.

Figure 3:
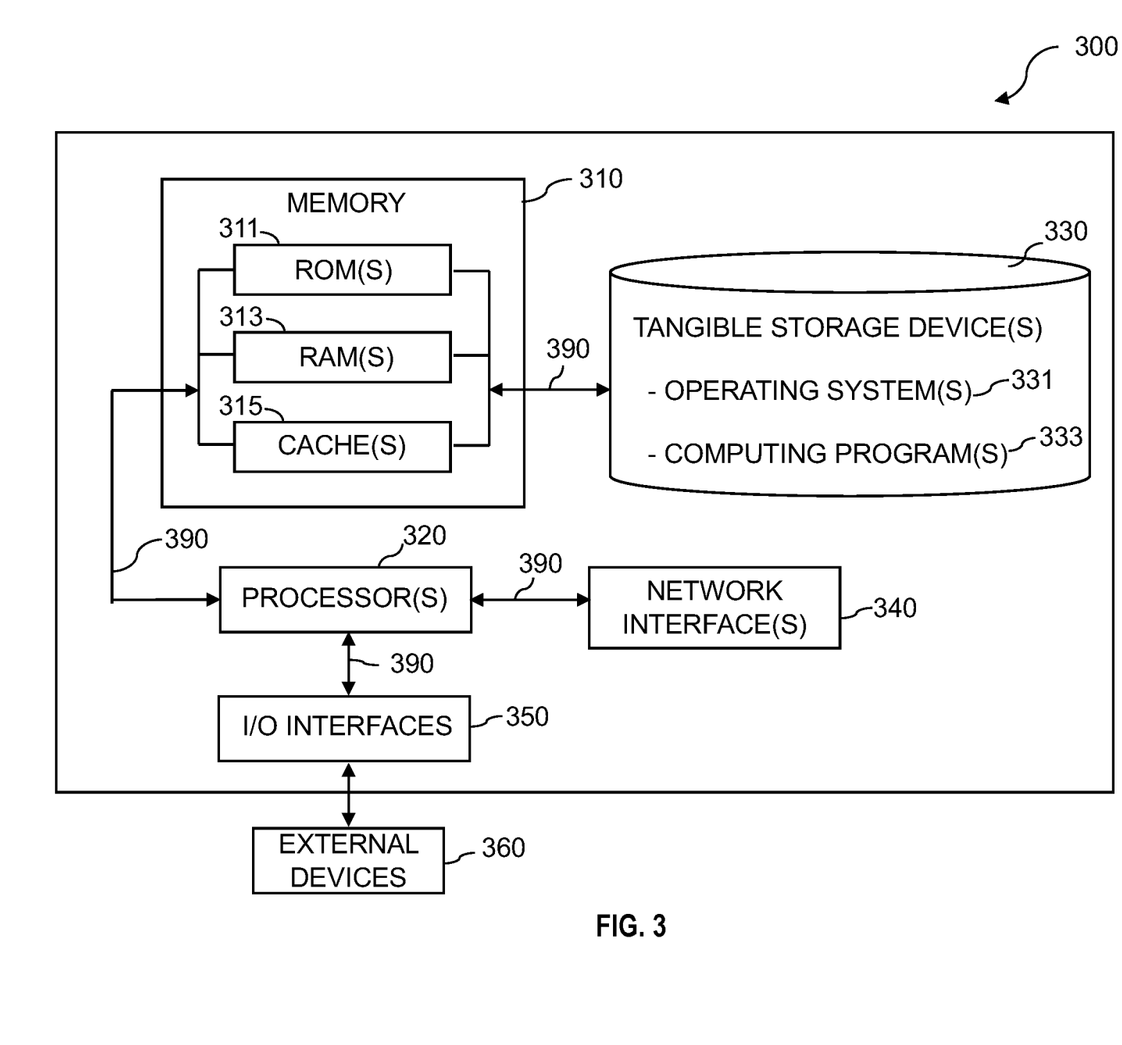
FIG. 3 is a diagram illustrating components of a computing device or server, in accordance with one embodiment of the present invention.

FIG. 3 is a diagram illustrating components of computing device or server 300, in accordance with one embodiment of the present invention. It should be appreciated that FIG. 3 provides only an illustration of one implementation and does not imply any limitations regarding the environment in which different embodiments may be implemented.

Referring to FIG. 3, computing device or server 300 includes processor(s) 320, memory 310, and tangible storage device(s) 330. In FIG. 3, communications among the above-mentioned components of computing device or server 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330.

Computing device or server 300 further includes I/O interface(s) 350. I/O interface(s) 350 allows for input and output of data with external device(s) 360 that may be connected to computing device or server 300. Computing device or server 300 further includes network interface(s) 340 for communications between computing device or server 300 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
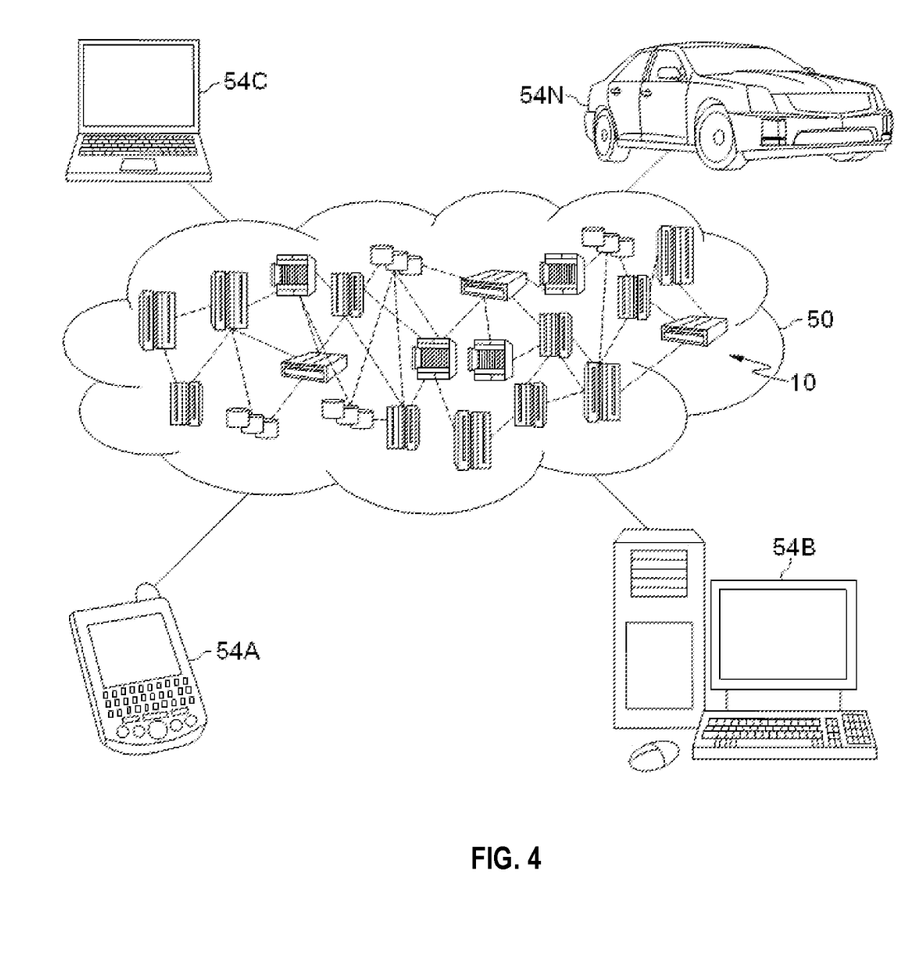
FIG. 4 depicts a cloud computing environment, in accordance with one embodiment of the present invention.

Referring now to FIG. 4, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 5:
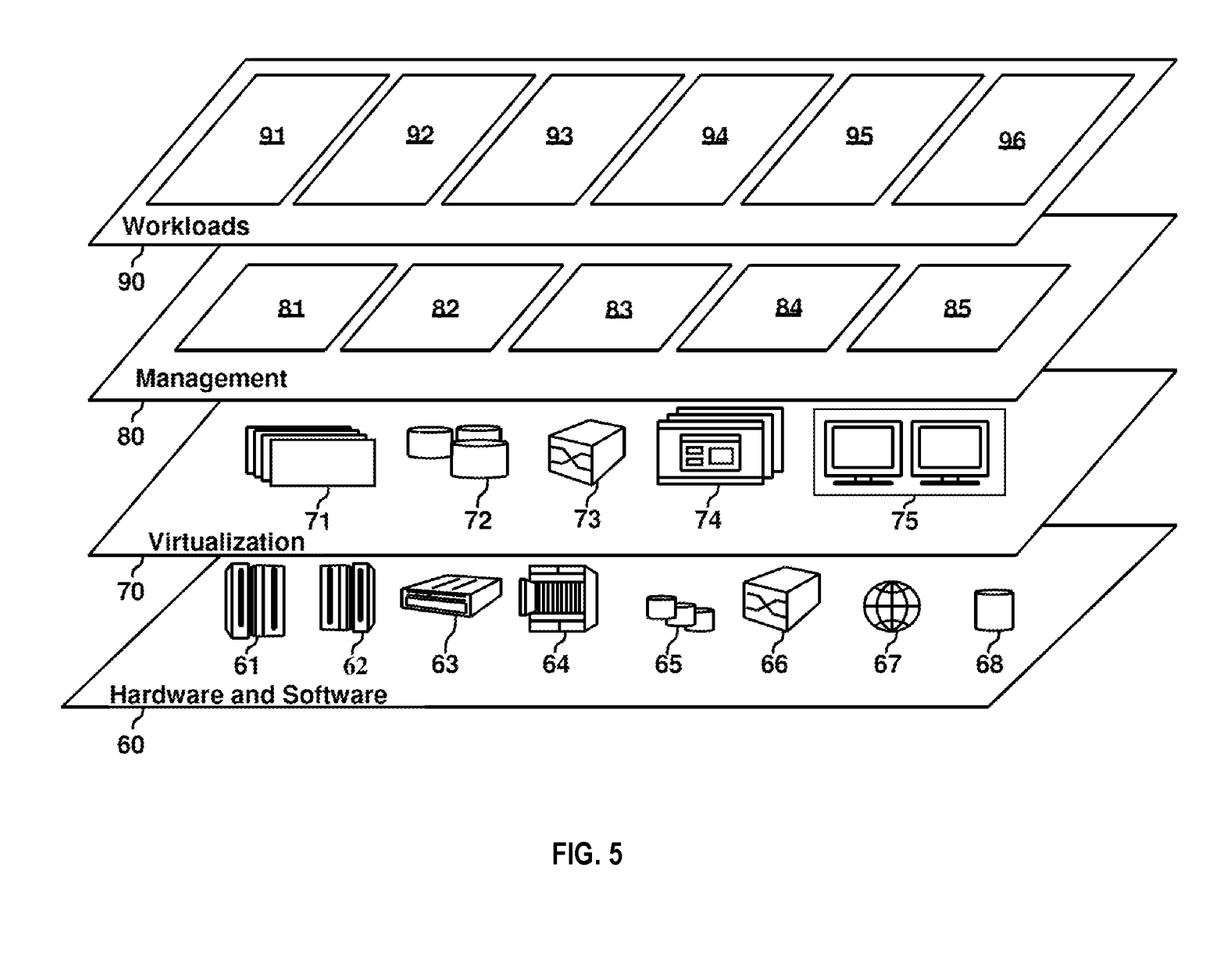
FIG. 5 depicts abstraction model layers in a cloud computing environment, in accordance with one embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of event-based dynamic prediction using a machine learning model in location sharing on mobile devices.

What is claimed is:

1. A computer-implemented method for event-based dynamic prediction in location sharing on mobile devices, the method comprising:
   in response to starting location sharing requested by a user, capturing biometric data of the user;
   collecting action-based context of behavior of the user during the location sharing;
   determining activities of the user and one or more sharing users during the location sharing;
   determining context of the location sharing;
   tracking activities of the user and the one or more sharing users after the location sharing is ended;
   tracking social network relationships between the user and the one or more sharing users; and
   creating a knowledge corpus for training a machine learning model for prediction in a future location sharing event, using obtained information related to the location sharing and related to the user and the one or more sharing users.

2. The computer-implemented method of claim 1, for creating the knowledge corpus, further comprising:
   using an augmented reality device of the user to analyze context of surroundings during the location sharing.

3. The computer-implemented method of claim 1, for creating the knowledge corpus, further comprising:

tracking historical location sharing abandonments at a location, in response to the location sharing being reinitiated for the location.

4. The computer-implemented method of claim 1, for creating the knowledge corpus, further comprising:
tracking duration of the location sharing, IoT (Internet of Things) feeds, and wearable device feeds, to ascertain a contextual situation when the location sharing is ended.

5. The computer-implemented method of claim 1, wherein determining context of the location sharing is by identifying activities prior to the location sharing and activities after location sharing in history of the user and the one or more sharing users.

6. The computer-implemented method of claim 1, further comprising:
receiving a location sharing event triggered by the user;
predicting a contextual situation of the location sharing event, using the machine learning model;
predicting one or more sharing users of the location sharing event, using the machine learning model; and
predicting a mode and duration of the location sharing event, using the machine learning model.

7. The computer-implemented method of claim 6, further comprising:
receiving, from the one or more sharing users of the location sharing event, confirmation for the location sharing event;
confirming parameters of a location;
starting the location sharing event; and
updating the knowledge corpus based on the location sharing event.

8. A computer program product for event-based dynamic prediction in location sharing on mobile devices, the computer program product comprising a computer readable storage medium having program instructions embodied therewith, the program instructions executable by one or more processors, the program instructions executable to:
in response to starting location sharing requested by a user, capture biometric data of the user;
collect action-based context of behavior of the user during the location sharing;
determine activities of the user and one or more sharing users during the location sharing;
determine context of the location sharing;
track activities of the user and the one or more sharing users after the location sharing is ended;
track social network relationships between the user and the one or more sharing users; and
create a knowledge corpus for training a machine learning model for prediction in a future location sharing event, using obtained information related to the location sharing and related to the user and the one or more sharing users.

9. The computer program product of claim 8, for creating the knowledge corpus, further comprising the program instructions executable to:
use an augmented reality device of the user to analyze context of surroundings during the location sharing.

10. The computer program product of claim 8, for creating the knowledge corpus, further comprising the program instructions executable to:
track historical location sharing abandonments at a location, in response to the location sharing being reinitiated for the location.

11. The computer program product of claim 8, for creating the knowledge corpus, further comprising the program instructions executable to:
track duration of the location sharing, IoT (Internet of Things) feeds, and wearable device feeds, to ascertain a contextual situation when the location sharing is ended.

12. The computer program product of claim 8, wherein determining context of the location sharing is by identifying activities prior to the location sharing and activities after location sharing in history of the user and the one or more sharing users.

13. The computer program product of claim 8, further comprising program instructions executable to:
receive a location sharing event triggered by the user;
predict a contextual situation of the location sharing event, using the machine learning model;
predict one or more sharing users of the location sharing event, using the machine learning model; and
predict a mode and duration of the location sharing event, using the machine learning model.

14. The computer program product of claim 13, further comprising the program instructions executable to:
receive, from the one or more sharing users of the location sharing event, confirmation for the location sharing event;
confirm parameters of a location;
start the location sharing event; and
update the knowledge corpus based on the location sharing event.

15. A computer system for event-based dynamic prediction in location sharing on mobile devices, the computer system comprising:
one or more processors, one or more computer readable tangible storage devices, and program instructions stored on at least one of the one or more computer readable tangible storage devices for execution by at least one of the one or more processors, the program instructions executable to:
in response to starting location sharing requested by a user, capture biometric data of the user;
collect action-based context of behavior of the user during the location sharing;
determine activities of the user and one or more sharing users during the location sharing;
determine context of the location sharing;
track activities of the user and the one or more sharing users after the location sharing is ended;
track social network relationships between the user and the one or more sharing users; and
create a knowledge corpus for training a machine learning model for prediction in a future location sharing event, using obtained information related to the location sharing and related to the user and the one or more sharing users.

16. The computer system of claim 15, for creating the knowledge corpus, further comprising the program instructions executable to:
use an augmented reality device of the user to analyze context of surroundings during the location sharing.

17. The computer system of claim 15, for creating the knowledge corpus, further comprising the program instructions executable to:
track historical location sharing abandonments at a location, in response to the location sharing being reinitiated for the location.

18. The computer system of claim 15, for creating the knowledge corpus, further comprising the program instructions executable to:
- track duration of the location sharing, IoT (Internet of Things) feeds, and wearable device feeds, to ascertain a contextual situation when the location sharing is ended.

19. The computer system of claim 15, wherein determining context of the location sharing is by identifying activities prior to the location sharing and activities after location sharing in history of the user and the one or more sharing users.

20. The computer system of claim 15, further comprising program instructions executable to:
- receive a location sharing event triggered by the user;
- predict a contextual situation of the location sharing event, using the machine learning model;
- predict one or more sharing users of the location sharing event, using the machine learning model;
- predict a mode and duration of the location sharing event, using the machine learning model;
- receive, from the one or more sharing users of the location sharing event, confirmation for the location sharing event;
- confirm parameters of a location;
- start the location sharing event; and
- update the knowledge corpus based on the location sharing event.

* * * * *